(12) United States Patent
Van Der Vliet et al.

(10) Patent No.: US 6,970,611 B1
(45) Date of Patent: Nov. 29, 2005

(54) OPTICAL COMPONENT HAVING REDUCED INTERFERENCE FROM RADIATION MODES

(75) Inventors: Frederik Marcel Van Der Vliet, Pasadena, CA (US); Joan Fong, San Marino, CA (US); Dazeng Feng, Arcadia, CA (US)

(73) Assignee: Kotura, Inc., Monterey Park, CA (US)

( * ) Notice: Subject to any disclaimer, the term of this patent is extended or adjusted under 35 U.S.C. 154(b) by 57 days.

(21) Appl. No.: 10/649,044

(22) Filed: Aug. 27, 2003

(51) Int. Cl.$^7$ ............................................. G02B 6/12
(52) U.S. Cl. ...................... 385/14; 385/130; 385/147; 257/3
(58) Field of Search .................... 385/14, 129–132, 385/147; 359/243; 257/3, 4

(56) References Cited

U.S. PATENT DOCUMENTS

| | | | |
|---|---|---|---|
| 5,710,847 A | 1/1998 | Takano et al. | |
| 6,002,514 A | 12/1999 | Barrett et al. | |
| 6,298,178 B1 | 10/2001 | Day et al. | |
| 6,374,001 B1 | 4/2002 | Bozeat et al. | |
| 6,608,945 B2 | 8/2003 | Deliwala | |
| 6,741,377 B2 * | 5/2004 | Miles ........................ | 385/14 X |
| 2002/0126939 A1 | 9/2002 | House et al. | |
| 2002/0126976 A1 | 9/2002 | Day | |
| 2003/0025070 A1 | 2/2003 | Deliwala | |
| 2003/0031394 A1 | 2/2003 | Deliwala | |
| 2003/0032286 A1 | 2/2003 | Deliwala et al. | |
| 2003/0035265 A1 | 2/2003 | Deluga | |
| 2003/0036266 A1 | 2/2003 | Deliwala | |
| 2003/0039430 A1 | 2/2003 | Deliwala | |
| 2003/0039439 A1 | 2/2003 | Deliwala | |
| 2003/0040134 A1 | 2/2003 | Deliwala | |
| 2003/0040175 A1 | 2/2003 | Deliwala | |
| 2003/0054639 A1 | 3/2003 | Deliwala | |
| 2004/0129949 A1 | 7/2004 | Deliwala et al. | |

FOREIGN PATENT DOCUMENTS

| | | |
|---|---|---|
| AU | 752697 | 6/1999 |
| GB | 2322205 | 8/1998 |
| JP | 08049897 | 2/1996 |
| WO | WO 98/43128 | 10/1998 |
| WO | WO 99/28772 | 6/1999 |

OTHER PUBLICATIONS

Day, I.E., *Solid State Absorption Attenuator in Silicon-on-Insulator with MHz Bandwidth,* Integrated Photonics Research Coference, May 2002, pp. 1-3.

Kasahara, R. et al., *Low Power Consumption Silica-Bases 2x2 Thermooptic Switch Using Trenched Silicon Substrate,* IEEE Photonics Technology Letters, vol. 11, No. 9, Sep. 1999, pp. 1132-1134.

* cited by examiner

Primary Examiner—Phan T. H. Palmer
(74) Attorney, Agent, or Firm—Gavrilovich, Dodd & Lindsey, LLP

(57) ABSTRACT

An optical component includes an optical device positioned between isolation channels. The isolation channels are configured to at least partially isolate different regions of the optical component from one another. The optical component also includes at least one light absorbing region positioned so as to intercept light traveling in a direction that would take the light between the optical device and an isolation channel.

36 Claims, 15 Drawing Sheets

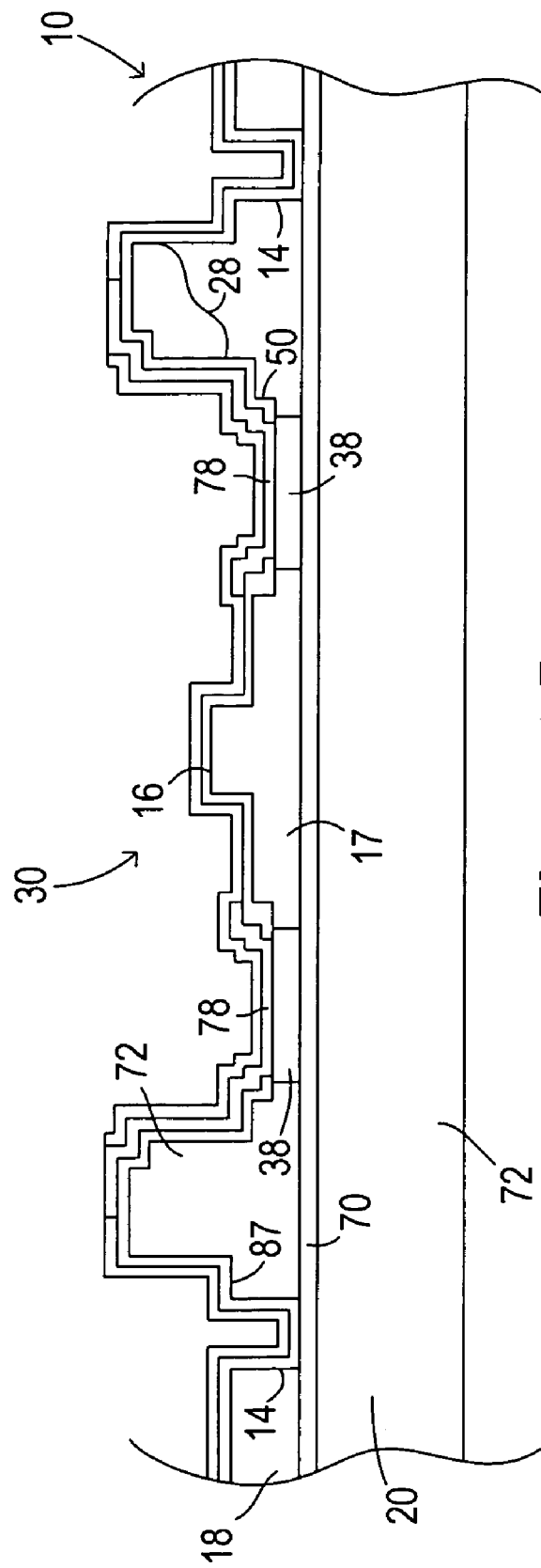

OPTICAL COMPONENT HAVING REDUCED INTERFERENCE FROM RADIATION MODES

RELATED APPLICATIONS

This application is related to U.S. patent application Ser. No. 10/371,642, filed on Feb. 21, 2003, now U.S. Pat. No. 6,853,793, entitled "Attenuator Having Reduced Optical Loss in the Pass Mode" and incorporated herein in its entirety.

BACKGROUND

1. Field of the Invention

The invention relates to optical devices. In particular, the invention relates to optical devices having a reduced interference from radiation modes.

2. Background of the Invention

A variety of optical components include one or more waveguides defined in a light transmitting medium positioned on base. These waveguides can include one or more structures which excite radiation modes that escape from the waveguide. Many of these optical components also include channels extending into the light transmitting medium so as to isolate different regions of the optical component from one another. The radiation modes excited at the transition structures can travel through the light transmitting medium and be reflected off these channels. The reflected radiation modes can then interfere with light signals traveling along the waveguide from which they originated or other waveguides on the optical component. This interference is often a function a wavelength and can accordingly cause polarization dependent loss (PDL) or wavelength dependent loss (WDL). As a result, there is a need for an optical device having reduced interference from radiation modes.

SUMMARY OF THE INVENTION

The invention relates to an optical component. The optical component includes an optical device positioned between isolation channels. The isolation channels are configured to at least partially isolate different regions of the optical component from one another. The optical component also includes at least one light absorbing region positioned to intercept light traveling in a direction that would take the light signal between the optical device and an isolation channel. In another embodiment of the optical component, the optical device is positioned between an isolation channel and a side of the optical component.

The invention also relates to a method of forming an optical component. The method includes forming an optical device between isolation channels. The method also includes forming at least one light absorbing region on the optical component such that the at least one light absorbing region is positioned so as to intercept light traveling in a direction that would take the light signal between the optical device and an isolation channel. In another embodiment of the method, the optical device is formed between an isolation channel and a side of the optical component.

A light absorbing region can be positioned between the optical device and an isolation channel. In some instances, the optical device includes at least one electrical contact positioned over a doped region. At least a portion of a light absorbing region can be positioned between the doped region and the isolation channel. A dopant in the light absorbing region can be different from a dopant in the adjacent doped region.

The optical device can include a waveguide having a transition structure where radiation modes can be excited. In some instances, one or more light absorbing regions are positioned adjacent to the transition structure.

In some instances, the optical device includes a waveguide defined by a ridge extending from a slab of a light transmitting medium. The optical device can also include at least one electrical contact positioned in a trench extending into the slab of light transmitting medium. The trench can extend alongside the ridge and be spaced apart from the ridge. In some instances, a distance between a side of the trench and the waveguide flares at one end of the trench.

BRIEF DESCRIPTION OF THE FIGURES

FIG. 7B is a cross section of the optical component 10 shown in FIG. 7A taken along the line labeled B.

DETAILED DESCRIPTION

The invention relates to an optical component having an optical device positioned between isolation channels. The isolation channels are configured to at least partially isolate different regions of the optical component from one another.

The optical device can include a waveguide with a transition structure where radiation modes can be excited. The optical component also includes at least one light absorbing region positioned to intercept a radiation mode traveling in a direction that would take the radiation mode between the optical device and an isolation channel. The locations of the light absorbing regions cause at least a portion of the radiation modes to be absorbed before the radiation modes can interfere with the output of the optical device.

In some instances, the one or more optical devices include an optical attenuator. At least one light absorbing region is positioned to intercept a radiation mode. As a result, the light absorbing regions reduce the interference between the radiation mode and the output of the attenuator. As a result, the light absorbing regions can reduce the polarization dependent loss (PDL) and/or the wavelength dependent loss (WDL) associated with the optical attenuator.

Figure 1A:
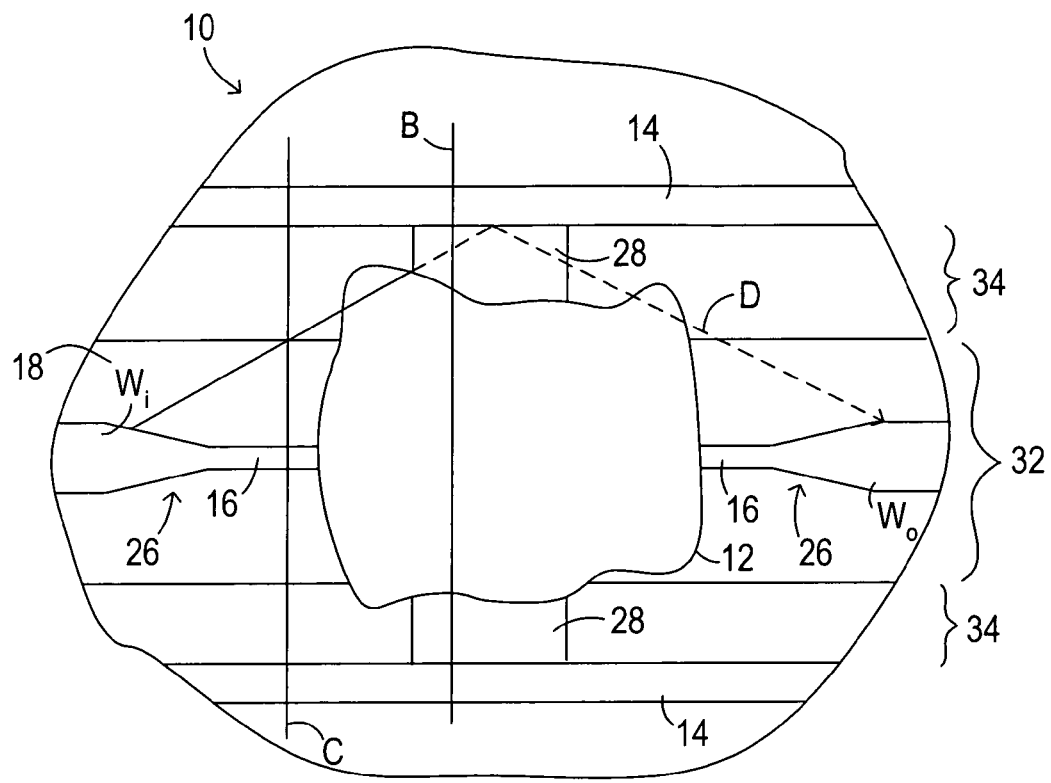
FIG. 1A is a topview of an optical component having an optical device positioned between isolation channels.
Figure 1B:
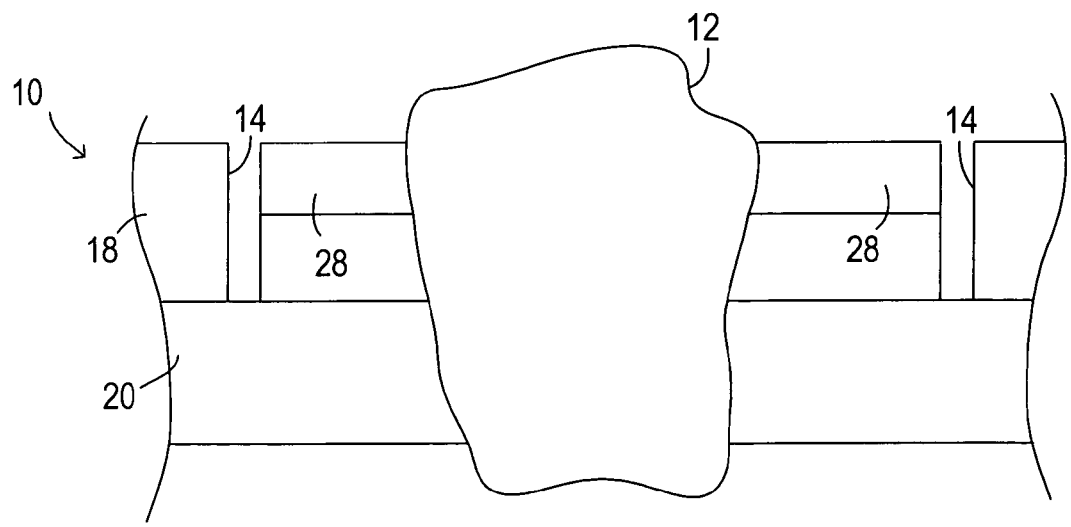
FIG. 1B is a cross section of the optical component shown in FIG. 1A taken along the line labeled B.
Figure 1C:
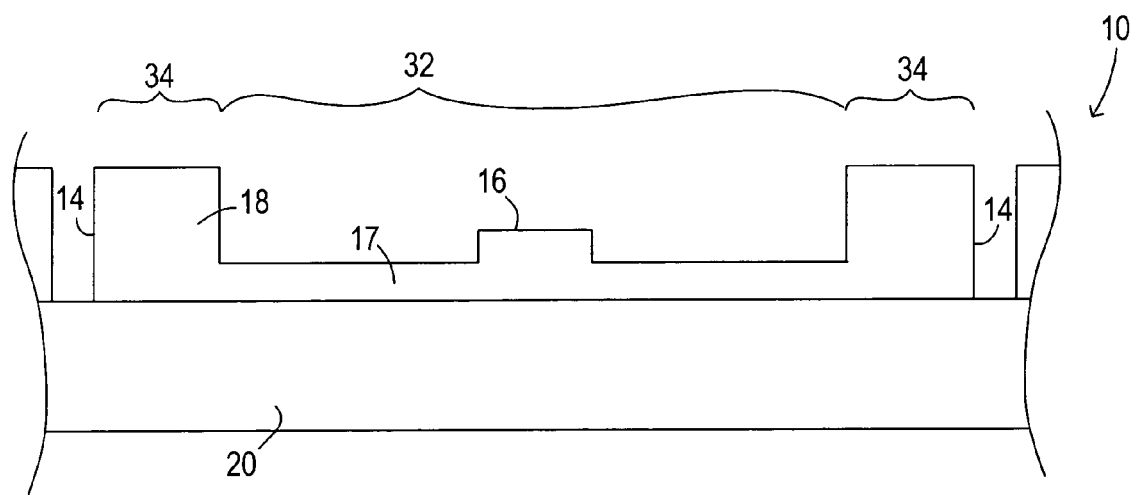
FIG. 1C is a cross section of the optical component shown in FIG. 1A taken along the line labeled C.

FIG. 1A is a topview of an optical component 10 having an optical device 12 positioned between isolation channels 14. FIG. 1B is a cross section of the optical component 10 shown in FIG. 1A taken along the line labeled B. FIG. 1C is a cross section of the optical component 10 shown in FIG. 1A taken along the line labeled C. The optical device includes a plurality of waveguides 16 defined by a ridge extending from a slab 17 of light transmitting medium 18 positioned on a base 20. Suitable light transmitting media include, but are not limited to, silicon, polymers, silica, SIN, GaAs, InP and LiNbO$_3$. The portion of the base 20 adjacent to the light transmitting medium 18 constrains the light signals within a waveguide 16.

The one or more optical devices 12 include a plurality of waveguides 16. One of the waveguides 16 can serve as an input waveguide 16 for carrying light signals to the one or more optical devices 12 and another of the waveguides 16 can serve as an output waveguide 16 for carrying the output from the one or more optical devices 12. For instance, the waveguide 16 labeled $W_i$ serves as an input waveguide 16 for carrying light signals to the optical devices 12 and the waveguide 16 labeled $W_o$ serves as an output waveguide 16 for carrying light signals away from the optical devices 12.

The optical devices 12 are positioned between isolation channels 14 extending into the light transmitting medium 18. The isolation channels 14 can serve to isolate different regions of the optical component 10 from one another. For instance, the isolation channels 14 can provide optical, thermal and/or electrical isolation of different regions of the optical component 10. Although the isolation channels 14 are shown extending all the way to the base 20, in some instances, the desired degree of isolation can be achieved without extending the isolation channels 14 all the way to the base 20.

The waveguides 16 include a transition structure 26 where radiation modes can be excited. Examples of transition structures 26, include, but are not limited to, curves, waveguide junctions and regions where the dimensions of the waveguide 16 change. In some instances, the interface between an optical fiber and an optical component can serve as a transition structure. Another example of a transition structure 26 where waveguides 16 dimensions change includes is a mode transformer. Many optical components 10 employ mode transformers positioned at the edge of the optical component 10 where they can be connected to an optical fiber. The mode transformer can be employed to reduce the spot size of a light signal to a size that is suitable for use with the waveguides 16 on the optical component 10. The waveguide 16 dimensions can be changed for a variety of other reasons. For instance, the width of a waveguide 16 can be expanded to reduce the polarization dependence of the waveguide 16 or to reduce the interaction of a light signal in the waveguide 16 with features adjacent to the waveguide 16.

The transition structure 26 can excite radiation modes as a light signal travels along the waveguides 16. The line labeled D illustrates a possible path that a radiation mode excited from the input waveguide can take through the light transmitting medium 18. The radiation mode can travel through the light transmitting medium 18 and be reflected off a side of an isolation channel 14. As illustrated by the dashed portion of the line labeled D, the reflected radiation mode can travel through the light transmitting medium 18 and enter the output waveguide 16. As a result, the radiation mode can interfere with the output of the optical device 12.

The optical component 10 includes at least one light absorbing region 28. The light absorbing region 28 is positioned so as to intercept at least a portion of a radiation mode. In some instances, one or more of the light absorbing regions 28 are positioned between the optical device 12 and an isolation channel 14. As a result, a radiation mode traveling between an isolation channel 14 and an optical device 12 can be absorbed before the radiation mode can enter the output waveguide. Because the radiation mode is absorbed before entering the output waveguide, the radiation mode does not interfere with the output of the optical device 12.

The light absorbing region 28 can extend all the way through the light transmitting medium 18 to the base 20 or can extend only part way through the light transmitting medium 18. The light absorbing region 28 can be a region of light transmitting medium 18 having a different composition. For instance, the light absorbing region 28 can be a doped region of the light transmitting medium 18. When the light transmitting medium 18 is silicon, suitable dopants include, but are not limited to, boron and phosphor. Suitable concentrations for a dopant in a light transmitting medium include, but are not limited to, concentrations greater than $10^{17}/cm^3$ and/or less than $10^{21}/cm^3$. As an alternative to a dopant, the light absorbing region 28 can be formed from a material different from the light transmitting medium 18.

Figure 2A:
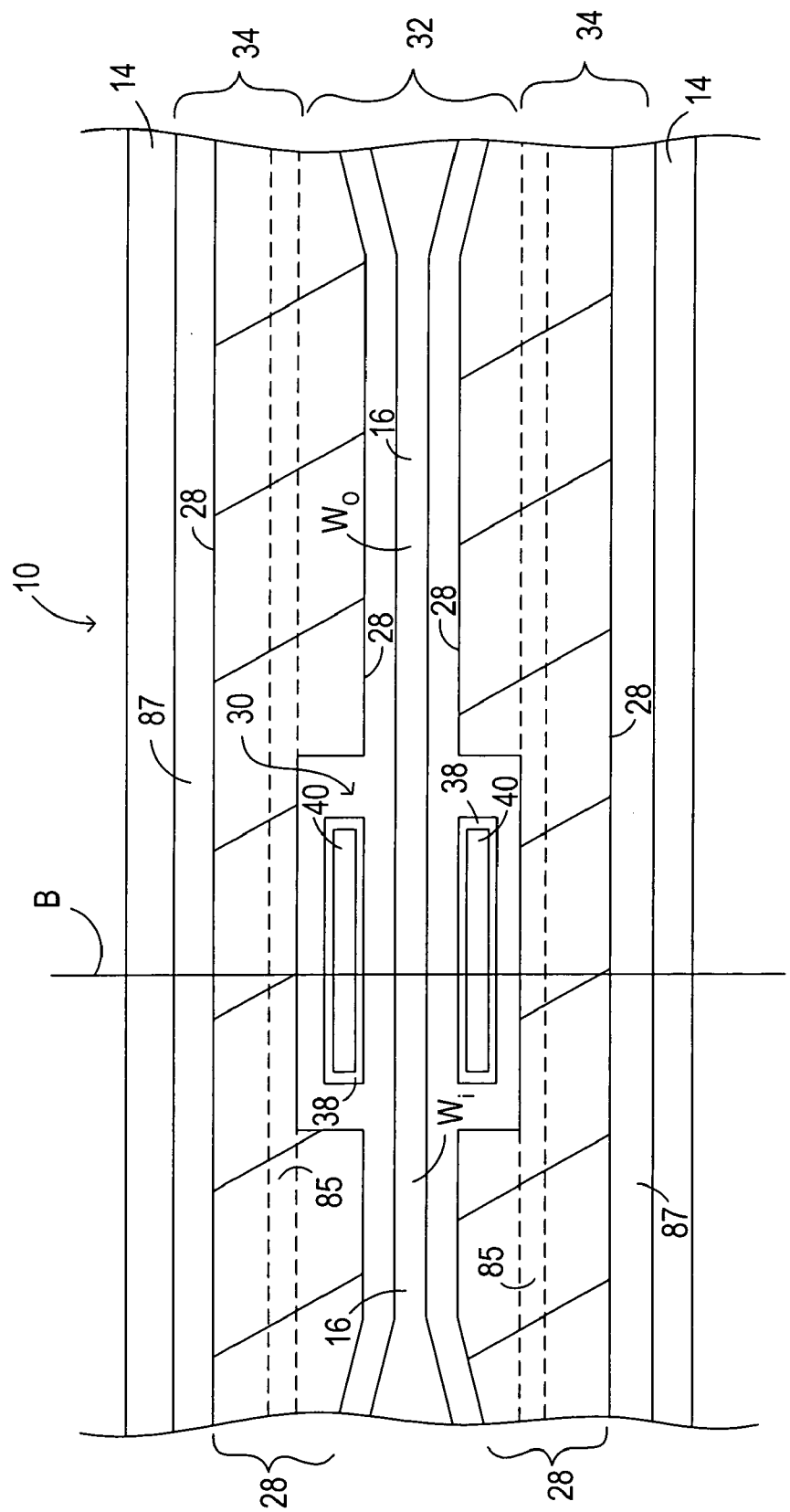
FIG. 2A is a topview of an optical component having an optical attenuator positioned between isolation channels.
Figure 2B:
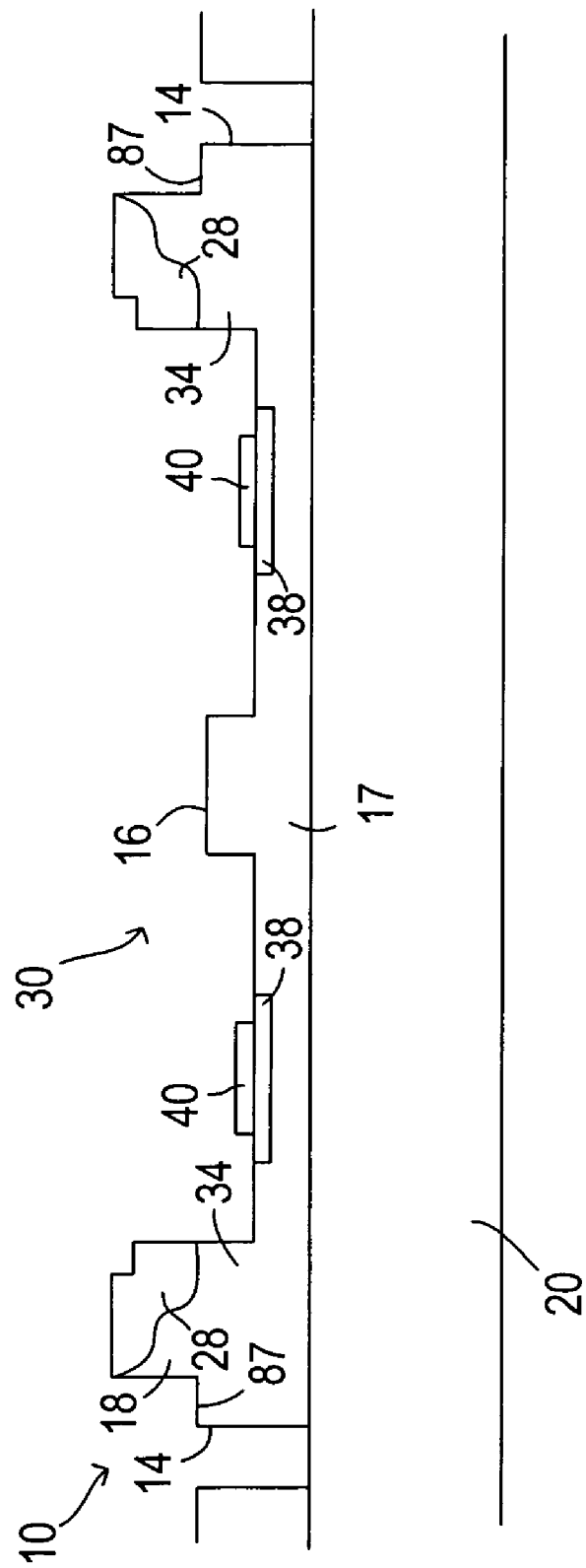
FIG. 2B is a cross section of the optical component shown in FIG. 2A taken at the line labeled B.

A suitable optical device 12 for use with the optical component 10 includes, but is not limited to, an optical attenuator 30. FIG. 2A through FIG. 2B illustrate an optical component 10 having an optical attenuator 30 positioned between isolation channels 14. FIG. 2A is a topview of the optical component 10. FIG. 2B is a cross section of the optical component 10 shown in FIG. 2A taken at the line labeled B. The dashed lines shown in FIG. 2A illustrate edges of the optical component 10 located within the light absorbing regions 28.

The optical attenuator 30 is formed in a device recess 32 positioned between walls 34. The attenuator 30 includes a waveguide 16. The portion of the waveguide 16 labeled $W_i$ serves as an input waveguide and the portion of the waveguide 16 labeled $W_o$ serves as an output waveguide 16. Doped regions 38 are formed on the bottom of the device recess 32. One of the doped regions 38 can include a P-type material and the other doped region 38 can include an N-type material. Suitable dopants include, but are not limited to, boron and phosphor. An electrical contact 40 is formed on each doped region 38. When the light transmitting medium 18 is silicon, a potential applied across the electrical contacts 40 can inject carriers into the waveguide 16. The injected carriers serve to attenuate a light signal traveling along the waveguide 16.

Light absorbing regions 28 are positioned to intercept radiation modes excited at the transition structure of the input waveguide, $W_i$. For instance, a light absorbing region 28 is positioned between each doped region 38 and an isolation channel 14. Additionally, a light absorbing region 28 extends along the waveguide 16 from a location adjacent to a doped region 38 to the transition structure 26 of the input portion of the waveguide, $W_i$. Further, a light absorbing region 28 extends along the waveguide 16 from a location adjacent to a doped region 38 to the transition structure 26 of the output portion of the waveguide, $W_O$. The position of the light absorbing region 28 adjacent to the transition structure 26 can increase the percentage of radiation modes that are absorbed by the light absorbing region 28. In some instances, one or more light absorbing regions 28 extend from a location adjacent to a doped region 38 past the transition structure 26.

The displacement between the light absorbing regions 28 and the waveguide 16 is selected to reduce or eliminate interference between the light absorbing regions 28 and a light signal traveling along the device waveguide 16. A suitable distance includes, but is not limited to, 8 $\mu$m. Additionally, the light absorbing regions 28 are placed far enough from one another to prevent formation of a guided multimode structure.

Although the light absorbing regions 28 are shown extending part way into the wall 34, the light absorbing regions 28 can extend through the wall to the base. Further, the light absorbing regions can extend to the isolation channels 14. When a dopant in the light transmitting medium 18 defines a light absorbing region 28, the light absorbing region 28 and the doped regions 38 associated with the attenuator 30 can be further apart than the diffusion length of the free carriers to reduce the light absorbing region from drawing carriers from the doped region 38. In some instances, the shortest distance between the light absorbing region 28 and the doped regions 38 are greater than 16 $\mu$m or greater than 20 $\mu$m.

Although the transition structure 26 is shown as being located between the isolation channels 14, the transition structure 26 need not be located between isolation channels 14.

Figure 3A:
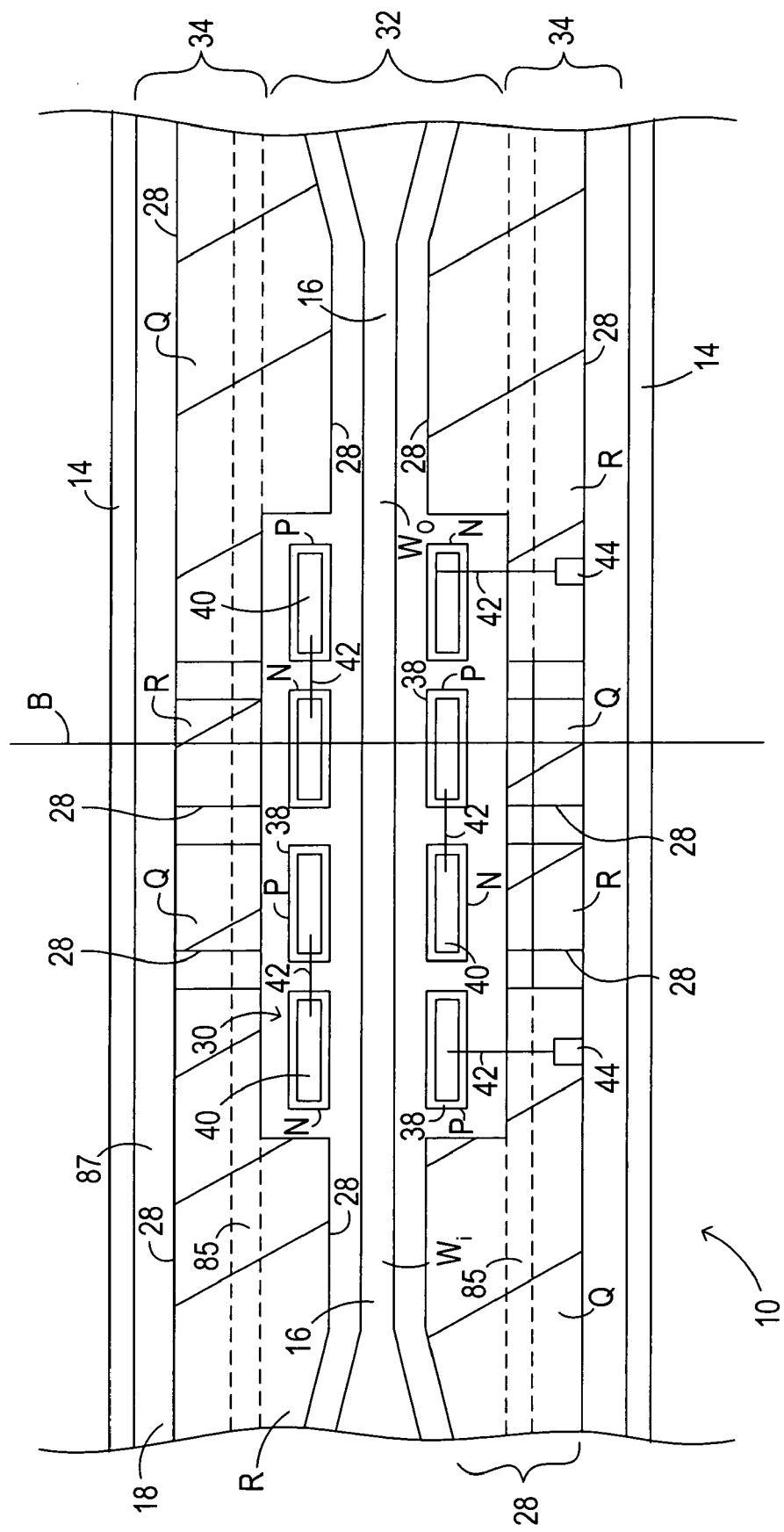
FIG. 3A is a topview of an optical component having a plurality of optical attenuators positioned between isolation channels.
Figure 3B:
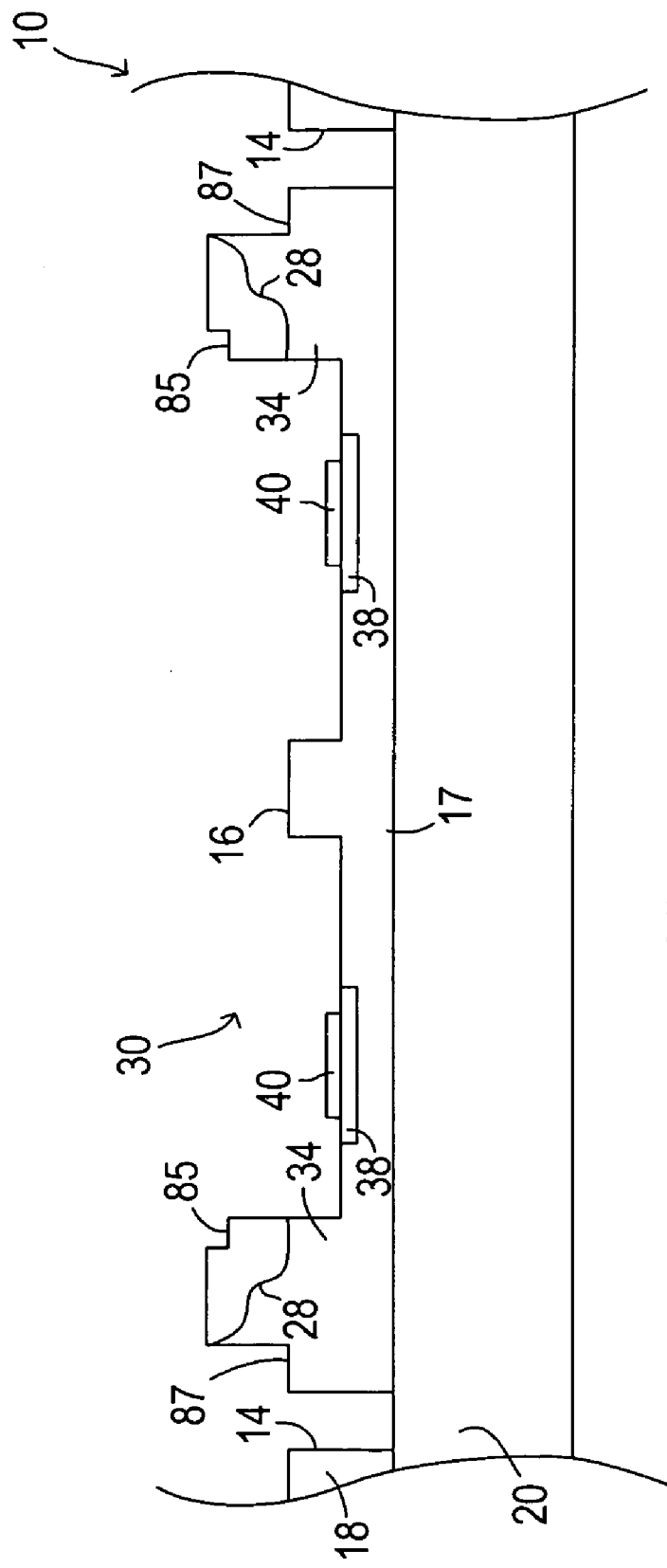
FIG. 3B is a cross section of the optical component shown in FIG. 3A taken along the line labeled B.

The optical device can include a plurality of optical attenuators 30 as illustrated in FIG. 3A and FIG. 3B. FIG. 3A is a topview of an optical component 10. FIG. 3B is a cross section of the optical component 10 shown in FIG. 3A taken along the line labeled B. A light absorbing region 28 is positioned between each doped region 38 and an isolation channels 14. Additionally, at least one light absorbing region 28 extends from between a doped region 38 and an isolation channel 14 to the transition structure 26 on the input portion of the waveguide 16. Further, at least one light absorbing region 28 extends from between a doped region 38 and an isolation channel 14 to the transition structure 26 of the output portion of the waveguide 16.

The doped regions 38 positioned opposite one another on opposing sides of the waveguide 16 can include different dopants. For instance, the doped regions 38 labeled P can include a different dopant than the doped regions 38 labeled N. A variety of electrical circuits can be employed to connect the electrical contacts 40. The illustrated electrical conductors 42 connect the attenuators 30 in series. The illustrated electrical conductors 42 also provide electrical communication between the electrical contacts 40 and contact pads 44. A potential applied between the contact pads 44 injects carriers into the waveguide 16 between electrical contacts 40 on opposing sides of the waveguide 16.

A light absorbing region 28 is positioned between the isolations channels and each doped region 38. When the light absorbing region 28 includes a dopant formed in the light transmitting medium 18, the dopant in the light absorbing region 28 can be the same as the dopant in the adjacent doped regions 38. For instance, the dopant in the doped regions 38 labeled P can the same as the dopant in the doped regions 38 labeled R and the dopant in the doped regions 38 labeled Q is the same as the dopant in the doped regions 38 labeled N. The use of the same dopant can prevent the formation of a parasitic current path. In some instances, the dopant in the light absorbing region 28 is different from dopant in the adjacent doped regions 38. Accordingly, the light absorbing regions 28 labeled Q can include a different dopant than the doped regions 38 labeled P and the light absorbing regions 28 labeled R can include a different dopant than the doped regions 38 labeled N. When the dopant in the light absorbing region is different from dopant in the adjacent doped regions, the spacing of the light absorbing region should be adequate to avoid parasitic current formation.

Although FIG. 1A through FIG. 3B show light absorbing regions positioned opposite one another on opposing sides of a waveguide, the light absorbing regions can be arranged such that the light absorbing regions are not positioned opposite one another. In some instances, when the light absorbing regions include a dopant and are positioned opposite from one another, the light absorbing regions can form an additional waveguide that can capture the radiation modes and guide them to the out put. Arranging the light absorbing regions so light absorbing regions are not positioned opposite one another can reduce the formation of this additional waveguide.

Figure 4A:
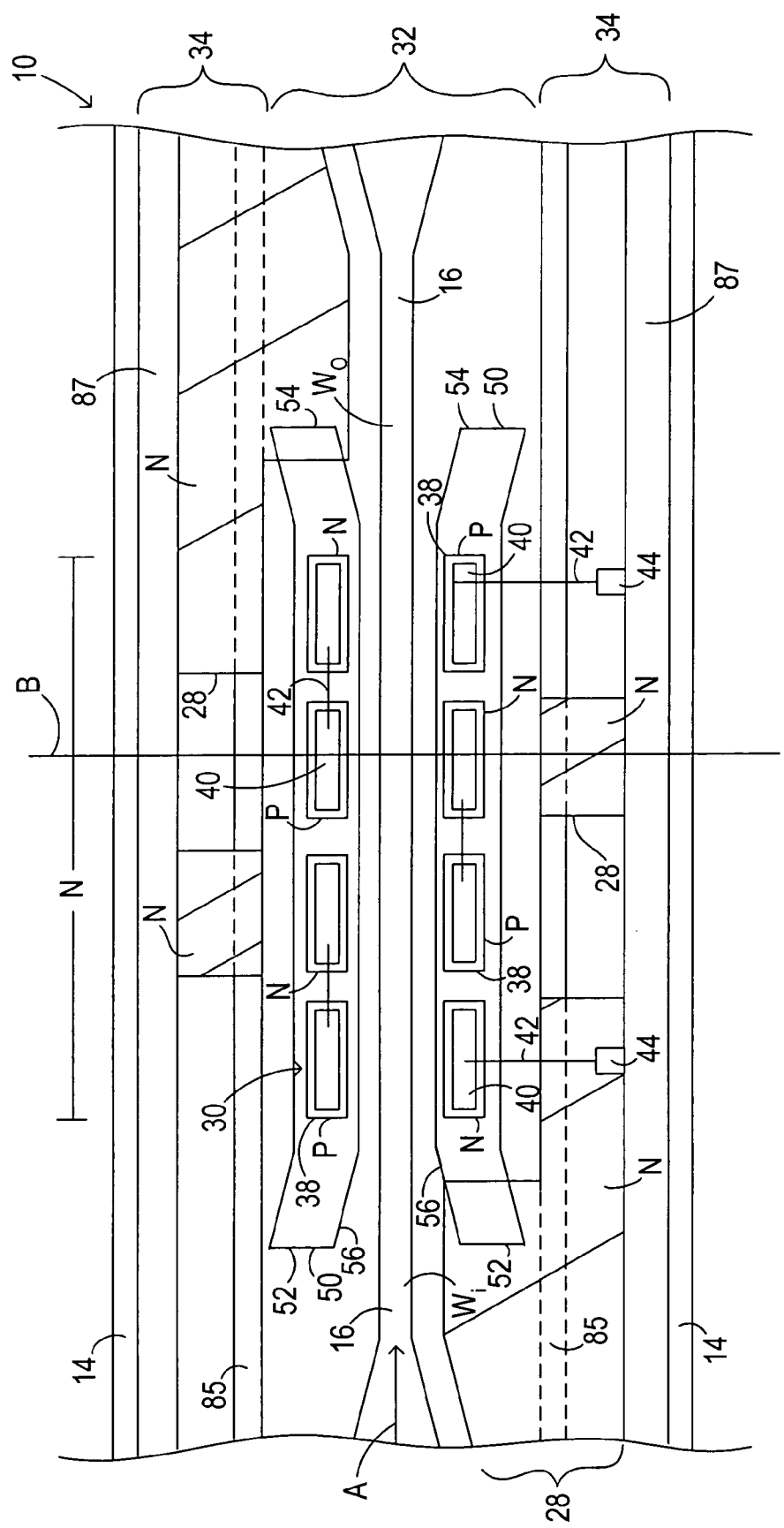
FIG. 4A is a topview of another embodiment of an optical component having a plurality of attenuators.
Figure 4B:
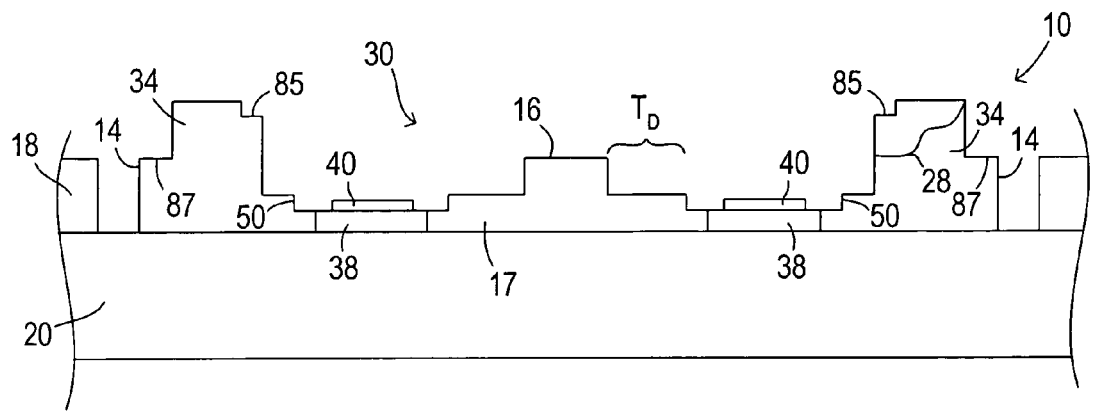
FIG. 4B is a cross section of the optical component shown in FIG. 4A taken at the line labeled B.

FIG. 4A through FIG. 4B illustrate another embodiment of an optical component 10 having a plurality of attenuators 30. FIG. 4A is a topview of the optical component 10. FIG. 4B is a cross section of the optical component 10 shown in FIG. 4A taken at the line labeled B. Trenches 50 extend into the light transmitting medium 18 on opposing sides of the waveguide 16. The doped regions 38 and the electrical contacts 40 are positioned on the bottom of the trenches 50. In some instances, reducing the trench 50 thickness can increase the attenuation efficiency by restricting the free carriers to the space between the trenches 50.

The doped regions 38 and electrical contacts 40 are formed on the bottom of each trench 50. The doped regions 38 positioned opposite one another on opposing sides of the waveguide 16 can include different dopants. For instance, the doped regions 38 labeled P can include a different dopant than the doped regions 38 labeled N. Although the doped regions 38 are shown extending part way through the light transmitting medium 18, the doped regions 38 can extend through the light transmitting medium 18 to the base 20. Extending the doped regions 38 further toward the base 20 can increase the efficiency of the attenuator 30 by constraining additional carriers between the doped regions 38.

FIG. 4A illustrates another suitable arrangement for the light absorbing regions 28. At least a portion of each light absorbing region 28 is positioned between an isolation channel 14 and a doped region 38. Additionally, the light absorbing regions 28 are arranged such that every other doped region 38 on one side of the waveguide 16 is positioned adjacent to a light absorbing region 28.

The doped regions 38 labeled P include different dopants than the doped regions 38 labeled N. The illustrated electrical conductors 42 connect the attenuators 30 in series. When the light absorbing medium includes a dopant in the light transmitting medium 18, the dopant in the light absorbing regions 28 can be the same as the dopant in the adjacent doped region 38 in order to prevent formation of a parasitic current path. For instance, each of the light absorbing regions 28 can include the same dopant as the doped regions 38 labeled N. As a result, these doped regions 38 and the light absorbing regions 28 can be formed concurrently.

The direction of light signal travel through the waveguide 16 of FIG. 4A is illustrated by the arrow labeled A. The light signal passes a leading end 52 of each trench 50 before entering the region between the trenches 50 and passes a following end 54 of each trench 50 upon exiting the region between trenches 50. The side of the trenches 50 nearest to the waveguide 16 is the active side 56 of the trench 50 and the side of the trench 50 furthest from the waveguide 16 is the inactive side 56 of the trench 50. The distance between the active side 56 of a trench 50 and the ridge of the waveguide 16 is the trench displacement, TD.

The trench 50 is constructed such that the trench displacement, TD, tapers from the leading end 52 to a narrow region labeled N in FIG. 4A. The trench displacement can be selected to provide an adiabatic contraction of the light signal entering the region between trenches 50 as opposed to the abrupt contraction that would occur without the taper. The taper of the trench displacement, TD, can reduce the reflection or scattering of a light signal that can result from interaction between the trenches 50 and the light signal upon the light signal entering the region between trenches 50.

The trench displacement also expands when moving from the narrow region toward the following end 54. The taper can be configured to provide a gradual expansion of the light signal as the light signal exits from the region between the trenches 50. Accordingly, the taper can reduce the excitement of radiation modes as the light signal exits the region between trenches 50. The expansion of the trench displacement when moving toward the following end 54 is optional.

Although FIG. 4A and FIG. 4B illustrate a plurality of optical devices employed in conjunction with the trenches, a single optical device can be employed in conjunction with the trenches. Additionally, the optical component of FIG. 4A can also be employed in conjunction with the arrangement of light absorbing regions shown in FIG. 3A.

Figure 5:
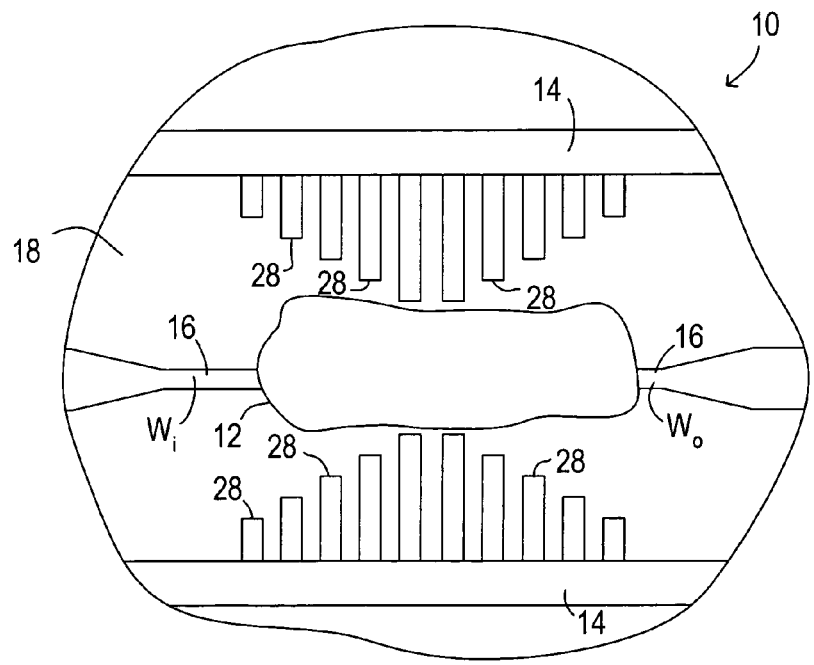
FIG. 5 illustrates an optical component having a plurality of light absorbing regions with different lengths.

Different arrangements for the light absorbing regions 28 are possible. FIG. 5 illustrates a possible arrangement of light absorbing regions 28. The light absorbing regions 28 have a length between the isolation channels 14 and the one or more optical devices 12. The length of the light absorbing regions 28 changes along the length of the one or more optical devices 12. For instance, the length of the light absorbing regions 28 increases toward the center of the one or more optical devices 12 and decreases toward the perimeter of the one or more optical devices 12. Although each light absorbing region 28 can be associated with a particular optical device 12, the light absorbing regions 28 need not be associated with an optical device 12. For instance, one or more light absorbing regions 28 can be positioned between optical devices 12. Additionally, one or more light absorbing regions 28 can be positioned outside the zone where the one or more optical devices 12 are located.

Figure 6A:
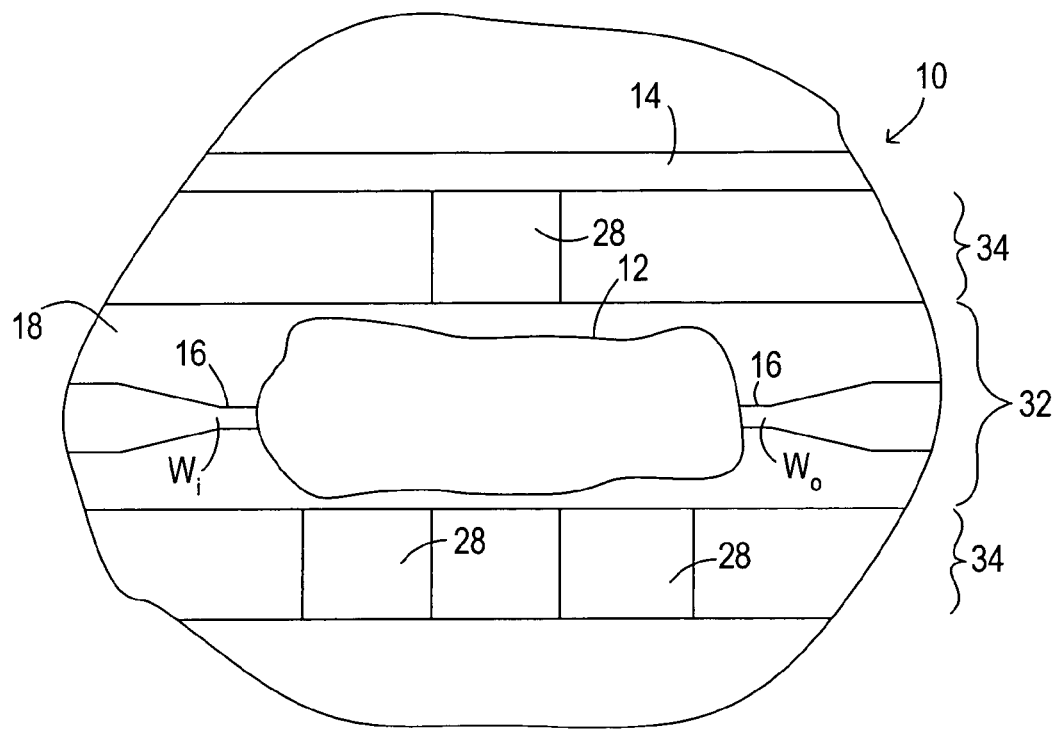
FIG. 6A is a topview of an optical component having an optical device positioned between an isolation channel and a side of the optical component.

In each of the embodiments illustrated above, one or more optical devices are shown positioned between isolation channels. However, the one or more optical devices can be positioned between a side of the optical component and an isolation channel as illustrated in FIG. 6A. The side of the optical component can also reflect radiation modes. As a result, the optical component can also include light absorbing regions arranged so as to intercept light signals traveling in a direction that will take them between the one or more optical devices and the side of the optical component.

Figure 6B:
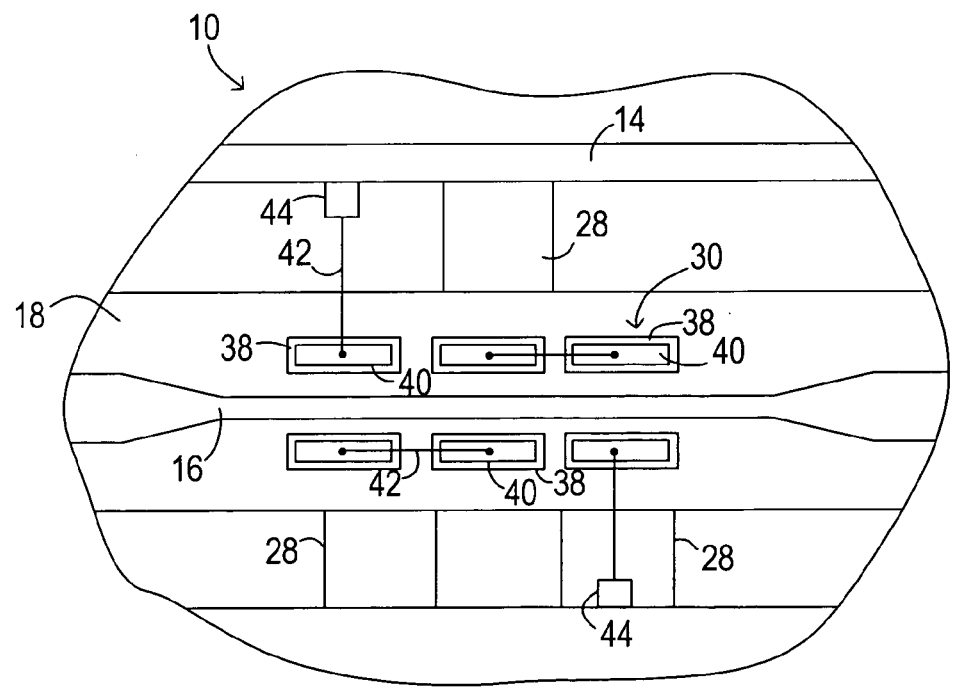
FIG. 6B is a topview of an optical component having optical attenuators positioned between an isolation channel and a side of the optical component.

FIG. 6B is a topview of the optical component shown in FIG. 6A with a plurality of optical attenuators serving as the optical devices. The optical attenuators 30 include doped regions 38 positioned opposite from one another on opposing sides of a waveguide 16. A portion of the doped regions 38 can include a P-type material and the opposite doped region 38 can include an N-type material. An electrical contact 40 is formed on each doped region 38. When the light transmitting medium 18 is silicon, a potential applied across the electrical contacts 40 can inject carriers into the waveguide 16. The injected carriers serve to attenuate a light signal traveling along the waveguide 16.

Light absorbing regions 28 are positioned to intercept radiation modes traveling in a direction that will take them between the one or more optical attenautors and the side of the optical component. When the light absorbing region 28 includes a dopant formed in the light transmitting medium 18, the dopant in the light absorbing region 28 can be the same as the dopant in the adjacent doped regions 38. The use of the same dopant can prevent the formation of a parasitic current path. In some instances, the dopant in the light absorbing region 28 is different from dopant in the adjacent doped regions 38. When the dopant in the light absorbing region is different from dopant in the adjacent doped regions, the spacing of the light absorbing regions should be adequate to avoid parasitic current formation.

Figure 6C:
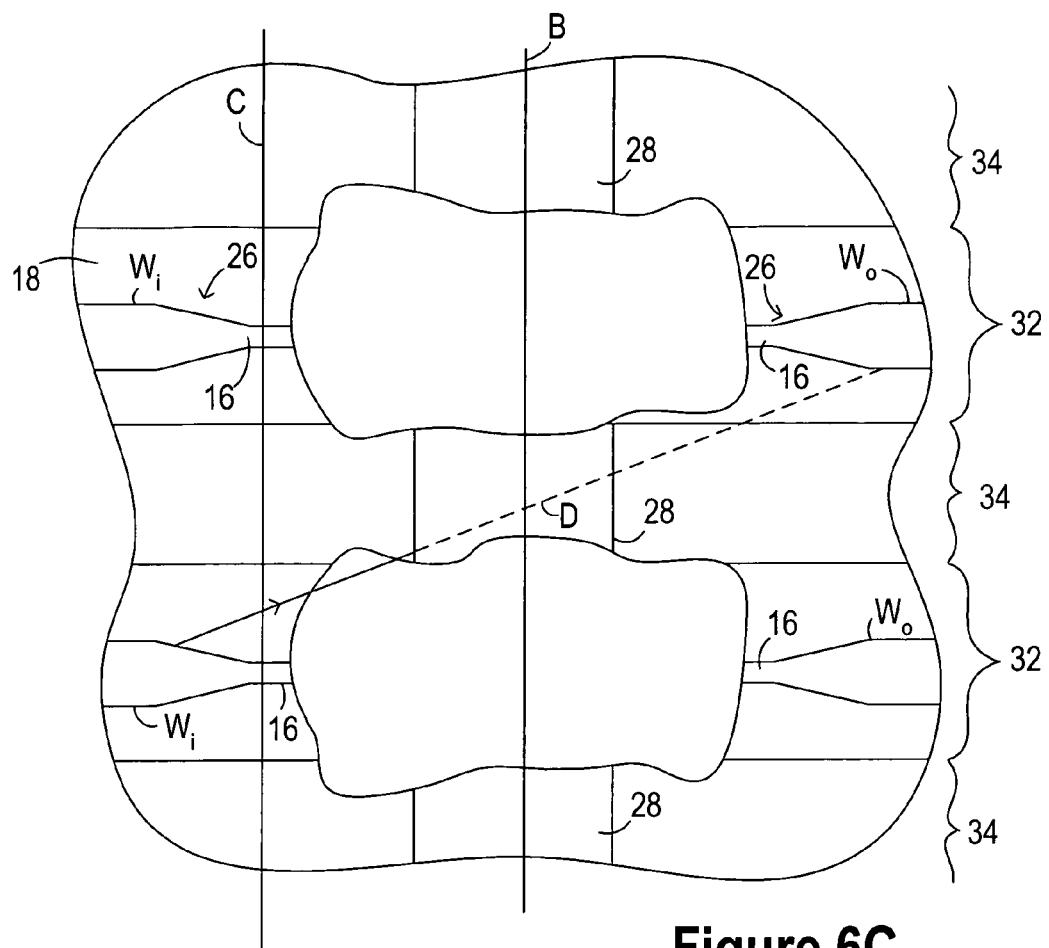
FIG. 6C is a topview of an optical component having light absorbing regions positioned between optical devices that are adjacent to one another on the optical component.
Figure 6D:
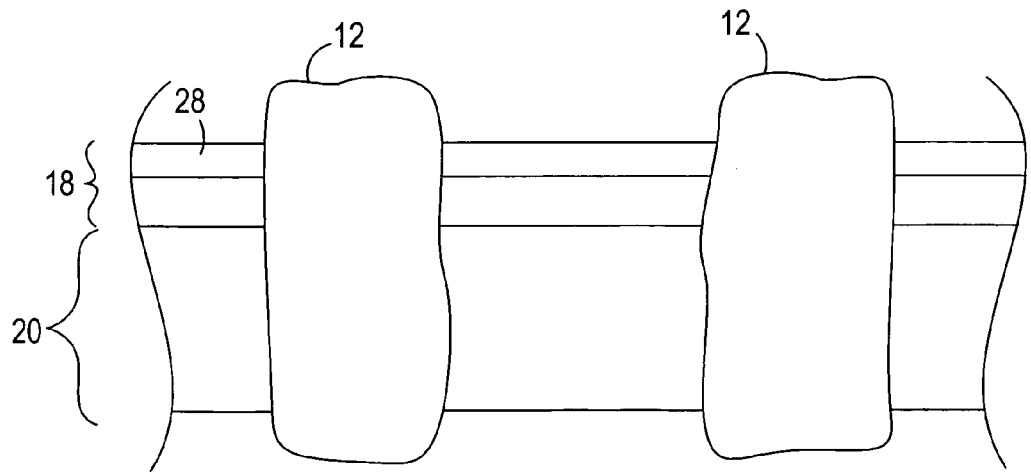
FIG. 6D is a cross section of the optical component shown in FIG. 6C taken along the line labeled E.
Figure 6E:
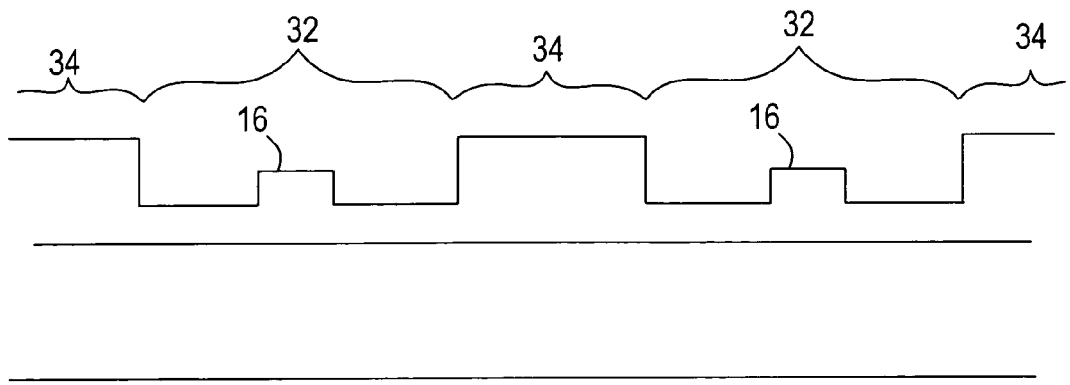
FIG. 6E is a cross section of the optical component shown in FIG. 6C taken along the line labeled F.

The light absorbing regions can be positioned between optical devices 12 that are adjacent to one another on the optical component 10. FIG. 6C is a topview of an optical component 10 having an optical device 12 positioned between isolation channels 14. FIG. 6D is a cross section of the optical component 10 shown in FIG. 6C taken along the line labeled E. FIG. 6E is a cross section of the optical component 10 shown in FIG. 6C taken along the line labeled F. The optical component 10 includes a plurality of optical devices 12 positioned adjacent to one another. The light transmitting medium extends between adjacent optical devices such that a light signal can travel through the light transmitting medium from one optical device to the adjacent optical device.

The line labeled D illustrates a possible path that a radiation mode excited from an input waveguide can take through the light transmitting medium 18. As illustrated by the dashed portion of the line labeled D, the radiation mode from one optical device can travel through the light transmitting medium 18 and interfere with the output waveguide of the adjacent optical device.

The optical component 10 includes at least one light absorbing region 28 positioned to intercept light traveling in a direction that would take the light between the optical device. For instance, FIG. 6D illustrates a light absorbing region positioned so as to intercept the radiation mode illustrated by the line labeled D. As a result, the illustrated radiation mode is absorbed before interfering with the output waveguide of another optical device. Because the radiation mode is absorbed before interfering with the output waveguide, the radiation mode does not interfere with the output of either optical device 12. In some instances, the one or more light absorbing regions are positioned between adjacent optical devices.

Figure 6F:
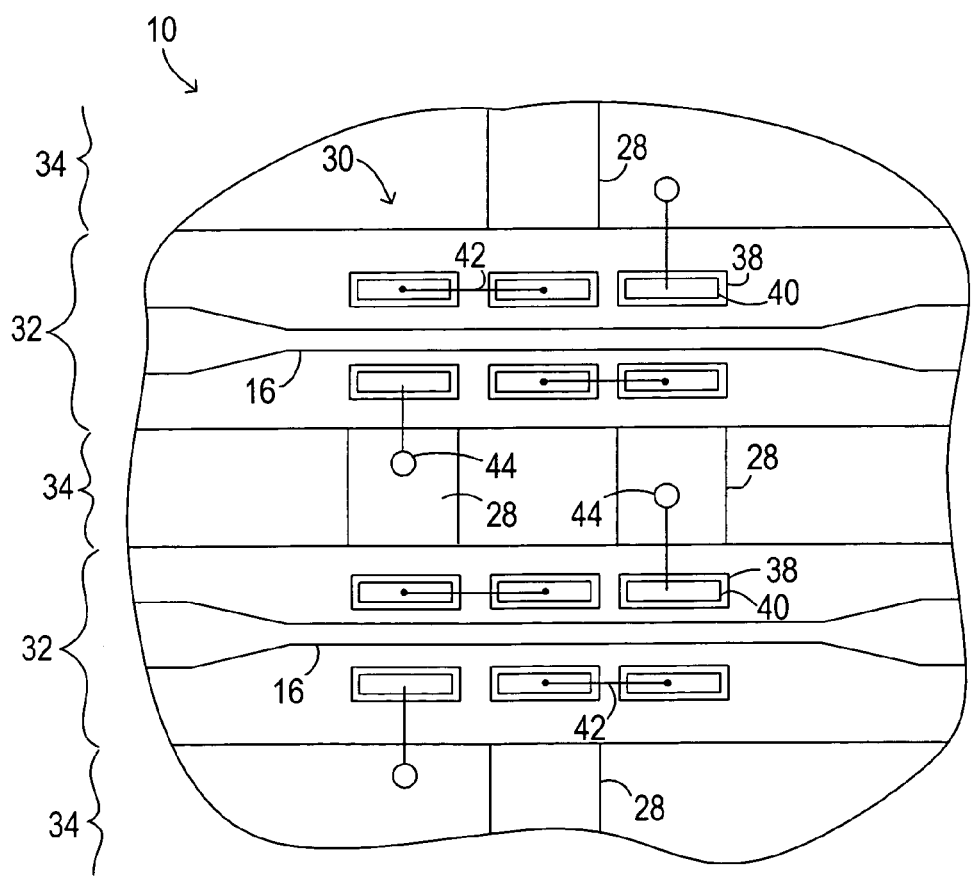
FIG. 6F is a topview of an optical component having light absorbing regions positioned between optical attenuators positioned adjacent to one another on the optical component.

FIG. 6F is a topview of the optical component shown in FIG. 6C with a plurality of optical attenuators serving as the optical devices. The optical attenuators 30 include doped regions 38 positioned opposite from one another on opposing sides of a waveguide 16. A portion of the doped regions 38 can include a P-type material and opposite doped region 38 can include an N-type material. An electrical contact 40 is formed on each doped region 38. When the light transmitting medium 18 is silicon, a potential applied across the electrical contacts 40 can inject carriers into the waveguide 16. The injected carriers serve to attenuate a light signal traveling along the waveguide 16.

Light absorbing regions 28 are positioned to intercept radiation modes traveling in a direction that will take them between the one or more optical attenuators and the side of the optical component. When the light absorbing region 28 includes a dopant formed in the light transmitting medium 18, the dopant in the light absorbing region 28 can be the same as the dopant in the adjacent doped regions 38. The use of the same dopant can prevent the formation of a parasitic current path. In some instances, the dopant in the light absorbing region 28 is different from dopant in the adjacent doped regions 38. When the dopant in the light absorbing region is different from dopant in the adjacent doped regions, the spacing of the light absorbing regions should be adequate to avoid parasitic current formation.

Figure 7A:
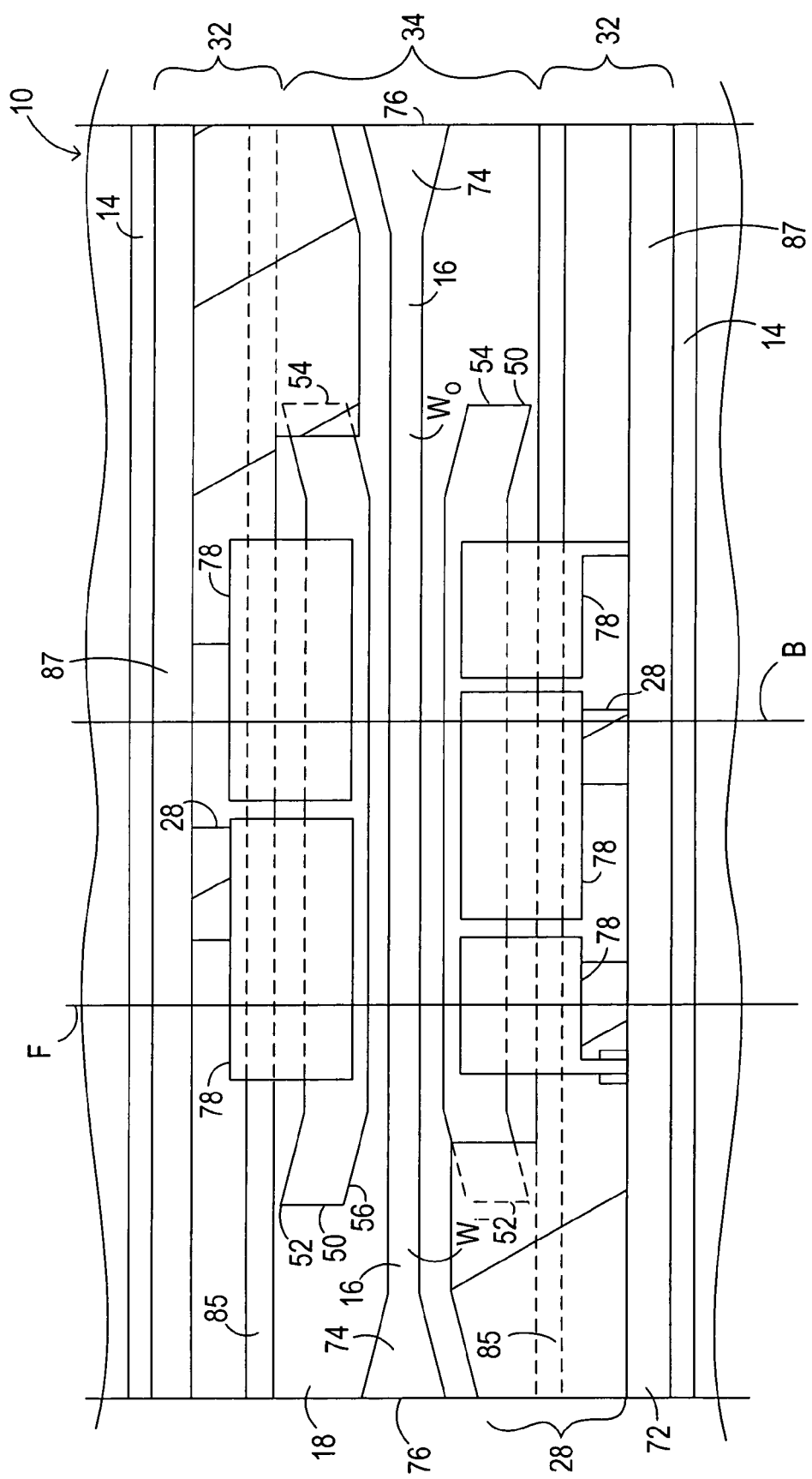
FIG. 7A is a topview of an optical component constructed on a silicon-on-insulator wafer.

FIG. 7A and FIG. 7B provide a specific example of an optical component 10 having a plurality of optical attenuators 30 positioned between isolation channels 14. FIG. 7A is topview of the optical component 10 and FIG. 7B is a cross section of the optical component 10 shown in FIG. 7A taken along the line labeled B. The optical component 10 is formed on a silicon-on-insulator wafer. A silicon-on-insulator wafer has a layer of silica 70 between layers of silicon. The top layer of silicon 72 serves as the light transmitting medium 18. The layer of silica 70 and the bottom layer of silicon 72 serve as the base 20.

The optical device includes a waveguide 16 having an input portion labeled $W_i$ and an output portion labeled $W_o$. The input portion of the waveguide 16 and the output portion of the waveguide 16 each include a mode transformer 74. Each mode transformer 74 ends at a facet 76 positioned at an edge of the optical component 10. The facets 76 can each be coupled to an optical fiber for carrying light signals to and/or from the optical component 10. The dimensions of the mode transformer 74 can be selected to provide a transition between the dimensions of the waveguide 16 and the dimensions of an optical fiber. A mode transformer 74 can serve as a transition structure 26 where radiation modes are excited. A transition from an optical fiber to an optical component can also serve as a transition structure 26 where radiation modes are excited.

Electrical conductors 78 are formed over a plurality of doped regions 38. The dashed lines show the location of an edge on the optical component 10 under the electrical conductor 78. The location of the doped regions 38 and the light absorbing regions 28 under the electrical conductors 78 are not shown in FIG. 7A because the doped regions 38 and the light absorbing regions 28 are arranged as shown in FIG. 4A. The electrical conductors 78 are arranged to serve as electrical contacts and as contact pads. Additionally, the electrical conductors serve to connect adjacent attenuators 30. The electrical conductors 78 are arranged so as to connect the optical attenuators 30 in series.

As noted above, the light absorbing regions 28 are arranged as shown in FIG. 4A. The dashed lines within the light absorbing regions 28 show the location of an edge within the light absorbing region 28. At least a portion of each light absorbing region 28 is positioned between an attenuator 30 and an isolation channel 14. A light absorbing region 28 extends alongside the input portion of the waveguide 16 from the edge of the optical component 10 to a location adjacent to a doped region 38. Additionally, a light absorbing region 28 extends alongside the output portion of the waveguide 16 from the edge of the optical component 10 to a location adjacent to a doped region 38. The light absorbing regions 28 include a N-type dopant such as phosphor.

As shown in FIG. 7B, a layer of silica 70 is formed over the silicon light transmitting medium 18. A moisture barrier is formed over the silica layer. A suitable moisture barrier includes, but is not limited to, a nitride layer 92. The silica layer and the moisture barrier are not shown in FIG. 7A in order to simplify FIG. 7A.

FIG. 8A through FIG. 8F illustrate a method of forming optical components 10 constructed according to FIG. 7A. The method can be performed on a wafer having a light transmitting medium 18 positioned on a base 20. An example of a suitable wafer includes, but is not limited to, a silicon-on-insulator wafer.

Figure 8A:
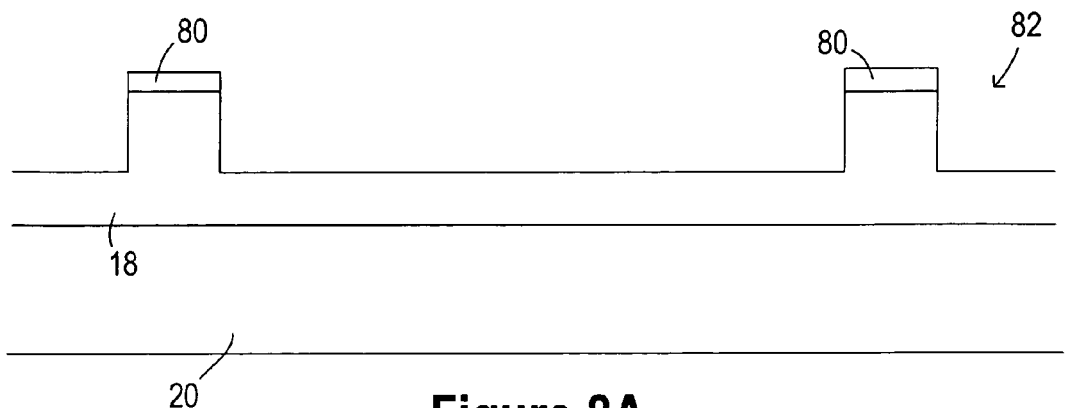
FIG. 8A through FIG. 8F illustrate a method of forming optical components constructed according to FIG. 7A and FIG. 7B.

A first mask 80 is formed on the wafer and a first etch performed so as to provide the component precursor 82 illustrated in FIG. 8A. The first mask 80 is formed so as to protect the region where the wall 34 is to be formed while leaving exposed the region where the device recess 32 and the isolation channels 14 are to be formed. The first etch defines the top of the ridge waveguide 16 and is accordingly performed for a duration that provides the exposed light transmitting medium 18 with the desired thickness of the waveguide 16. A suitable first mask 80 includes, but is not limited to, a photoresist or an oxide.

Figure 8B:
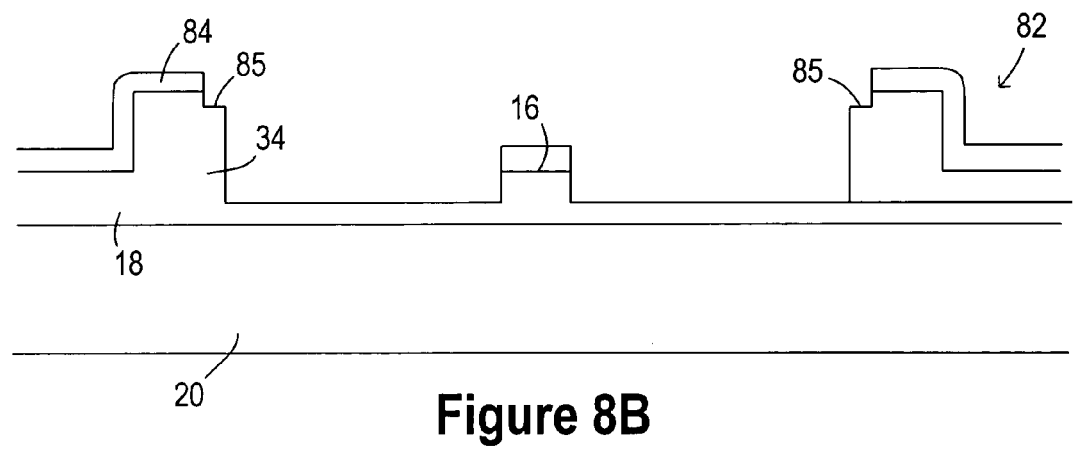
Figure 8C:
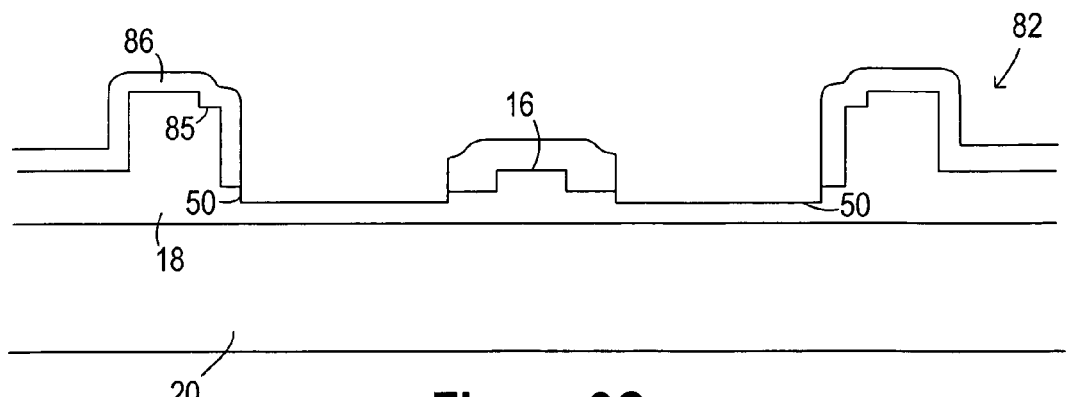
Figure 8D:
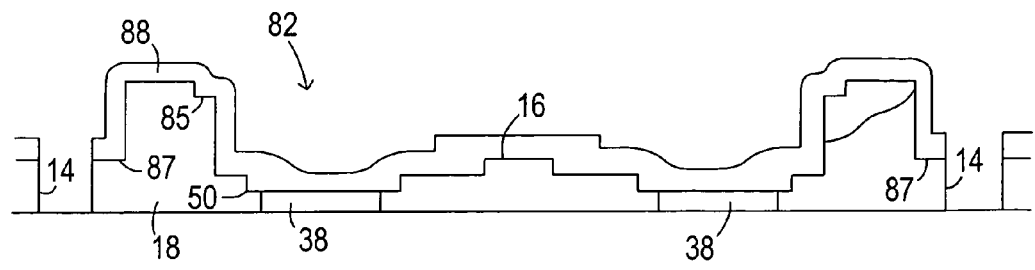

The first mask 80 is removed and a second mask 84 is formed on the component precursor 82. A second etch is performed so as to provide the optical component 10 shown in FIG. 8B. The second mask 84 is formed so as to protect the region where the waveguide 16 is to be formed. The second mask 84 can also be formed so as to protect the entire width of the wall 34 or a portion of the wall 34 as shown in FIG. 8B. The second etch defines the waveguide 16 on the optical component 10 and is accordingly performed for a duration that provides the ridge of the waveguide 16 with the desired thickness. Because the second mask 84 need not be aligned with the wall 34, the second etch can also form a recess 85 in the wall 34. A suitable second mask 84 includes, but is not limited to, a photoresist or oxide.

The second mask 84 is removed and a third mask 86 is formed on the component precursor 82. A third etch is performed so as to provide the optical component 10 shown in FIG. 8C. The third mask 86 is formed such that the region where the trench 50 is to be formed remains exposed while the remaining component precursor 82 is protected. The third etch forms the trenches 50 on the component precursor and is accordingly performed for a duration that provides the trenches 50 with the desired depth. A suitable third mask 86 includes, but is not limited to, a photoresist or oxide.

The third mask 86 is removed and a fourth mask 88 is formed on the component precursor 82. A fourth etch is performed so as to provide the component precursor 82 shown in FIG. 8D. The fourth mask 88 is formed so the regions where the isolation channels 14 are to be formed remain exposed while the remaining component precursor 82 is protected. The fourth etch is performed to the desired depth of the isolation channel 14. Because the fourth mask need not be aligned with the wall, the fourth etch can form a platform 87 in the isolation channel. A suitable fourth mask 88 includes, but is not limited to, a photoresist or oxide.

The doped regions 38 and/or the light absorbing regions 28 can be formed after the third mask 86 is removed and before the fourth mask 88 is formed on the component precursor 82. Alternatively, the doped regions 38 and/or the light absorbing regions 28 can be formed after removing the fourth mask 88. Traditional integrated circuit fabrication techniques can be employed to form the doped regions 38. When the light absorbing regions 28 include a dopant formed in the light transmitting medium 18, traditional integrated circuit fabrication techniques can be employed to form the light absorbing regions 28 concurrently with the doped regions 38. For instance, ion implantation and ion diffusion techniques can be employed to concurrently form the light absorbing regions 28 and the doped regions 38 on the optical component 10.

Figure 8E:
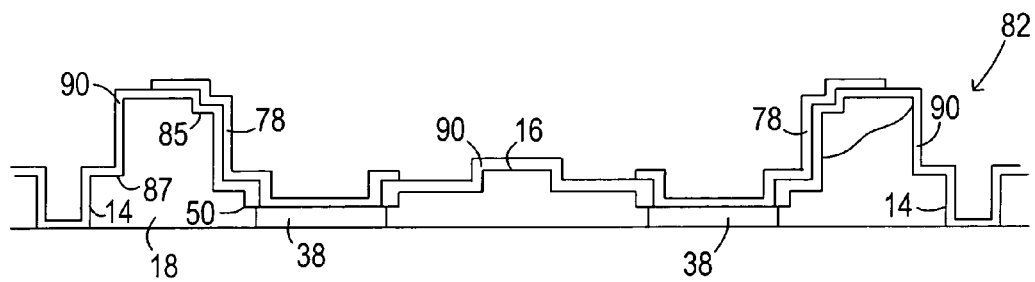

FIG. 8E shows the component precursor 82 after removal of the fourth mask 88 and formation of the doped regions 38 and the light absorbing regions 28. A fifth mask 90 is formed on the component precursor 82 such that the regions where the electrical contacts 40 are to be formed remain exposed and the remainder of the optical component 10 is protected. A suitable fifth mask 90 includes, but is not limited to, an $SiO_2$ layer or photoresist. Electrical conductors 78 are formed on the component precursor 82 in the desired locations employing traditional integrated circuit fabrication techniques. In some instances, the electrical conductors 78 are formed over the fifth mask 90. The electrical conductors 78 can serve as the electrical contacts 40 and/or the contact pads 44. Additionally, the electrical conductors 78 can connect the electrical contacts 40 with one another or with contact pads 44.

Figure 8F:
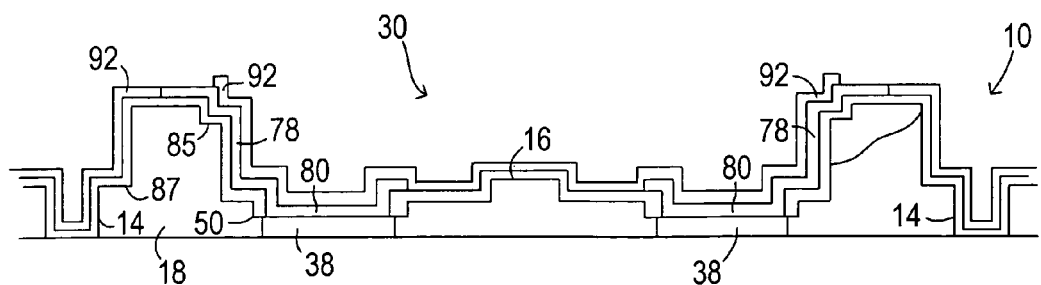

Additional layers of material can optionally be formed on the component precursor 82 to form the optical component 10 shown in FIG. 8F. For instance, a nitride layer 92 can be formed on the silica layer. A suitable method for depositing the additional layer of material includes, but is not limited to, PECVD. The optical component shown in FIG. 8F is a cross section of the optical component shown in FIG. 7A taken along the line labeled F.

Although FIG. 8A through FIG. 8F illustrate a method for forming an optical component 10 according to FIG. 7A, the method can be adapted to form other embodiments of the optical component 10. For instance, an optical component 10 according to FIG. 2A can be fabricated by forming the fourth mask 88 and performing the fourth skipping the third mask 86 and third etch shown in FIG. 3C. Additionally, the method can be adapted to forming an optical component having an optical device positioned between an isolation channel and a side of the optical component. For instance, the wall formed in FIG. 8A can be formed along the side of the optical component. Further, the method can be adapted to forming an optical component having light absorbing regions positioned between optical devices. For instance, the optical component 10 can be fabricated as shown above without the formation of the isolation channels and with the optical devices adjacent to one another on the optical component 10.

Portions of the optical component 10 outside of the optical device 12 can be formed concurrently with formation of the optical device 12. For instance, one or more steps in the formation of the optical device 12 can be performed so as to form at least a portion of a mode transformer. Alternatively, the optical device 12 can be protected during formation of the mode transformer and the mode transformer can be protected during formation optical device 12.

Although each of the embodiments shown above has one or more optical devices with a single waveguide, the one or more optical device can include a plurality of waveguides. Further, a plurality of input waveguides and/or a plurality of output waveguides can be connected to the one or more optical devices.

Many of the above principles are disclosed in the context of an optical component having a light absorbing region positioned to intercept light traveling in a direction that would take the light between the optical device and an isolation channel. However, in some instances, the optical component does not include an isolation channel as evident in FIG. 6C through FIG. 6E. The above principles can be applied to an optical component having one or more light absorbing regions positioned to intercept light traveling in a direction that would take the light between the optical devices.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An optical component, comprising:
an optical device positioned between isolation channels configured to at least partially isolate different regions of the optical component from one another; and
at least one light absorbing region positioned so as to intercept light traveling in a direction that would take the light between the optical device and an isolation channel.

2. The component of claim 1, wherein the optical device includes a plurality of electrical contacts and a plurality of doped regions; and
a plurality of light absorbing region, each light absorbing region being positioned adjacent to a different doped region.

3. The component of claim 2, wherein a dopant in each of the light absorbing regions is the same as a dopant in the adjacent doped region.

4. The component of claim 2, wherein a light absorbing region is positioned adjacent to every other doped region positioned on one side of a waveguide.

5. The component of claim 1, wherein the optical device includes a waveguide defined by a ridge extending from a slab of a light transmitting medium and wherein the optical device includes at least one electrical contact positioned in a trench extending into the slab of light transmitting medium.

6. The component of claim 5, wherein a distance between a side of the trench and the waveguide tapers at one end of the trench.

7. The component of claim 1, wherein the optical device includes at least one electrical contact positioned over a doped region.

8. The component of claim 7, wherein at least a portion of a light absorbing region is positioned between the doped region and an isolation channel.

9. The component of claim 1, wherein the optical device includes a waveguide having a transition structure where radiation modes can be excited.

10. The component of claim 9, wherein at least a portion of at least one light absorbing region is located adjacent to the transition structure.

11. The component of claim 1, wherein at least one light absorbing region is positioned between the optical device and an isolation channel.

12. The component of claim 1, wherein the optical device includes a waveguide formed in a light transmitting, the at least one isolation channel extending through the light transmitting medium to a base.

13. An optical component, comprising:
an optical device positioned between an isolation channel and an edge of the optical component, the isolation channel being configured to at least partially isolate different regions of the optical component from one another; and
at least one light absorbing region positioned so as to intercept light traveling in a direction that would take the light between the optical device and an isolation channel.

14. The component of claim 13, wherein the optical device includes a plurality of electrical contacts and a plurality of doped regions; and
a plurality of light absorbing region, each light absorbing region being positioned adjacent to a different doped region.

15. The component of claim 14, wherein a dopant in each of the light absorbing regions is the same as a dopant in the adjacent doped region.

16. The component of claim 14, wherein a light absorbing region is positioned adjacent to every other doped region positioned on one side of a waveguide.

17. The component of claim 13, wherein at least one light absorbing region is positioned between the optical device and the isolation channel.

18. The component of claim 13, wherein the optical device includes at least one electrical contact positioned over a doped region and at least a portion of a light absorbing region is positioned between the doped region and an isolation channel.

19. The component of claim 13, wherein the optical device includes a waveguide defined by a ridge extending from a slab of a light transmitting medium and wherein the optical device includes at least one electrical contact positioned in a trench extending into the slab of light transmitting medium.

20. The component of claim 13, wherein the optical device includes a waveguide having a transition structure where radiation modes can be excited and at least a portion of at least one light absorbing region is located adjacent to the transition structure.

21. The component of claim 13, wherein the optical device includes a waveguide formed in a light transmitting, the at least one isolation channel extending through the light transmitting medium to a base.

22. An optical component, comprising:
a light transmitting medium positioned on a base;
a plurality of optical devices positioned on the base such that the light transmitting medium extends between the optical devices;
at least one light absorbing region positioned so as to intercept light traveling through the light transmitting medium between optical devices; and
wherein the optical device includes at least one electrical contact positioned over a doped region and at least a portion of a light absorbing region is positioned between the doped region and the adjacent optical device.

23. An optical component, comprising:
a light transmitting medium positioned on a base;
a plurality of optical devices positioned on the base such that the light transmitting medium extends between the optical devices;
at least one light absorbing region positioned so as to intercept light traveling through the light transmitting medium between optical devices; and
wherein the optical device includes a waveguide defined by a ridge extending from a slab of the light transmitting medium and wherein the optical device includes at least one electrical contact positioned in a trench extending into the slab of light transmitting medium.

24. An optical component, comprising:
a light transmitting medium positioned on a base;
a plurality of optical devices positioned on the base such that the light transmitting medium extends between the optical devices;
at least one light absorbing region positioned so as to intercept light traveling through the light transmitting medium between optical devices; and
wherein the optical device includes a plurality of electrical contacts and a plurality of doped regions and the optical component includes a plurality of light absorbing region, each light absorbing region being positioned adjacent to a different doped region.

25. The component of claim 24, wherein a light absorbing region is positioned adjacent to every other doped region positioned on one side of a waveguide.

26. The component of claim 25, wherein the optical device includes a waveguide having a transition structure where radiation modes can be excited and at least a portion of at least one light absorbing region is located adjacent to the transition structure.

27. The component of claim 24, wherein a dopant in each of the light absorbing regions is the same as a dopant in the adjacent doped region.

28. A method of forming an optical component, comprising:
forming an optical device between isolation channels configured to at least partially isolate different regions of the optical component from one another; and
forming at least one light absorbing region on the optical component such that the at least one light absorbing region is positioned so as to intercept light traveling in a direction that would take the light between the optical device and an isolation channel.

29. The method of claim 28, wherein forming the optical device includes forming at least one electrical contact formed over a doped region.

30. The method of claim 29, wherein at least a portion of a light absorbing region is positioned between the doped region and an isolation channel.

31. The method of claim 29, wherein forming the optical device includes a forming a ridge extending from a slab of a light transmitting medium and forming at least one electrical contact in a trench extending into the slab of light transmitting medium.

32. The method of claim 28, wherein forming the optical device includes forming a plurality of doped regions such that each light absorbing region is positioned adjacent to a different doped region.

33. The method of claim 32, wherein a dopant in each of the light absorbing regions is different from a dopant in the adjacent doped region.

34. The method of claim 32, wherein the optical device includes a waveguide having a transition structure where radiation modes can be excited and at least one light absorbing region is positioned adjacent to the transition structure.

35. The method of claim 28, wherein at least one light absorbing region is formed between the optical device and an isolation channel.

36. A method of forming an optical component, comprising:

obtaining an optical component having an optical device positioned between an isolation channel and an edge of the optical component, the isolation channel being configured to at least partially isolate different regions of the optical component from one another; and forming at least one light absorbing region on the optical component such that the at least one light absorbing region is positioned so as to intercept light traveling in a direction that would take the light between the optical device and an isolation channel.

* * * * *